United States Patent [19]

Waugh

[11] Patent Number: 5,232,754
[45] Date of Patent: Aug. 3, 1993

[54] BARRIER LABEL FOR BEVERAGE BOTTLE

[75] Inventor: Richard A. Waugh, Bethlehem, Pa.

[73] Assignee: Allied Signal Inc., Morris Township, Morris County

[21] Appl. No.: 788,649

[22] Filed: Nov. 6, 1991

[51] Int. Cl.$^5$ ............................................. B29D 22/00
[52] U.S. Cl. .................................. 428/367; 428/36.6; 428/36.92; 428/475.2; 428/475.8; 428/476.3; 428/483; 428/516; 428/910
[58] Field of Search ............... 428/36.92, 35.7, 483, 428/516, 475.2, 475.8, 476.3, 910, 36.7, 366, 198

[56] References Cited

U.S. PATENT DOCUMENTS

| | | | |
|---|---|---|---|
| 3,733,309 | 5/1973 | Wyeth et al. | 260/757 |
| 4,254,169 | 3/1981 | Schroeder | 428/36.6 |
| 4,323,416 | 4/1982 | Malthouse et al. | 156/521 |
| 4,601,926 | 7/1986 | Jabarin et al. | 428/36.92 |
| 4,643,925 | 2/1987 | Smith et al. | 428/36.6 |
| 4,869,963 | 9/1989 | Gallucci et al. | 428/412 |
| 4,898,784 | 2/1990 | Sanders et al. | 428/412 |
| 4,999,229 | 3/1991 | Moritani et al. | 428/36.6 |

FOREIGN PATENT DOCUMENTS 0132565  6/1984  European Pat. Off.
40752   8/1989  Japan.

OTHER PUBLICATIONS

"Modern Plastics Encyclopedia", vol. 57, No. 10A, pp. 345-348, McGraw Hill, Oct. 1980.

*Primary Examiner*—Edith Buffalow
*Attorney, Agent, or Firm*—Michael U. Lee; Roger H. Criss

[57] ABSTRACT

This invention relates to a gas barrier properties imparted label for polyethylene terephthalate bottles. In accordance with the present invention there is provided a barrier label for PET beverage bottles comprising an outer protective layer of a thermoplastic polymer, a barrier layer selected from the group consisting of polyvinyl alcohol and ethylene vinyl alcohol copolymers, an inner protective layer of a thermoplastic polymer, and an optional, opaque thermoplastic layer, wherein the label reduces the carbon dioxide permeability of the section of the beverage bottles enveloped by the label to below 1 cc/100 in$^2$/24 hr.

22 Claims, No Drawings

BARRIER LABEL FOR BEVERAGE BOTTLE

BACKGROUND OF THE INVENTION

1. Field of the Invention

The present invention relates to polyethylene terephthalate bottles having improved gas barrier properties. Particularly, this invention relates to a gas barrier label for polyethylene terephthalate bottles.

2. Description of the Prior Art

The wide use of food and beverage containers fabricated from polyethylene terephthalate (PET) is due to the good balance of physical and mechanical properties of the polymer, including clarity, formability, gas and moisture barrier properties, and inertness to a wide variety of chemicals. Such desirable characteristics of PET have led to its wide acceptance as a carbonated-beverage bottle material. In addition, the carbonated-beverage bottles fabricated from PET offer impact-resistance, and are less expensive and lighter than glass bottles. In the U.S., the PET bottles have almost completely replaced two liter and larger glass beverage bottles.

PET carbonated-beverage bottles are usually produced by the stretch blow molding process which is designed to impart biaxial orientation in the bottle, wherein such biaxial orientation improves impact resistance, gloss, clarity, and stiffness. The stretch blow molding process is a two step process as described, for example, in U.S. Pat. No. 3,733,309 to Wyeth et al. The first step involves forming a relatively small, thick walled parison having a test-tube shape by, for example, an injection molding process. Subsequently, the resulting parison is reheated to the softening temperature of the parison, i.e., above the glass transition temperature and below the crystal melting temperature of the thermoplastic parison. The reheated parison is placed in a blow mold in which it is stretched to induce vertical orientation and blown to shape. The blowing step induces horizontal orientation to the resulting bottle. The bottle prepared according to the stretch blow molding process does not have the same degree of orientation at every point; however, the areas that are less oriented have a thicker shell than the areas that are more highly oriented. The cylindrical section of the bottle has the thinnest shell thickness. The combination of the shell thickness and orientation provides relatively high overall strength to the resulting bottle.

In addition to the strength requirement, another important property requirement of a carbonated-beverage bottle is the gas barrier property, particularly for carbon dioxide and oxygen, that is needed to preserve the taste of its content during the normal shelf-life. In general, the loss of carbonation of more than about 15% makes a carbonated-beverage unmarketable. Although PET provides sufficient gas barrier properties for large containers, wherein the surface area of the container is small compared to the volume of the content inside, its barrier properties are not adequate for small containers, such as bottles smaller than one liter. This inadequacy is attributable to the high surface to content volume ratio in the small bottles. For example, a 2-liter bottle has about 900 cm$^2$ of surface area whereas a ½-liter bottle has about 350 cm$^2$ Therefore, a 2-liter bottle has the surface to content volume ratio of about 450 cm$^{-1}$ whereas a ½-liter bottle has about 700 cm$^{-1}$.

There have been many efforts to improve the barrier properties of the PET containers in order to increase the shelf-life of carbonated-beverage products packaged in small containers. Barrier polymer coatings, such as with polyvinylidene chloride, and heat setting to increase the crystallinity of the PET containers are two of such efforts. Another method of improving barrier properties of the PET bottle is described in Japanese Patent 40752 (Aug. 31, 1989). Such patent discloses a post-fabrication extra wrapping layer for PET carbonated-beverage bottles utilizing a heat shrinkable polyester film coated with a polyvinylidene chloride barrier resin. Yet another method of coextruding PET with other barrier resins to form a coextruded bottle has been known in the art. However, such coextruded bottles are not readily recyclable, creating disposal problems.

A novel method of improving the gas barrier properties of PET carbonated-beverage bottles is utilizing a barrier label. As mentioned above, the stretch blow molded bottle does not have a uniform shell thickness. The cylindrical section of the bottle has the thinnest shell thickness and, therefore, this section is most susceptible to the carbon dioxide permeation. In general, the label of the beverage bottle is affixed to and covers most part of this section. U.S. Pat. No. 4,601,926 to Jabarine discloses a method of utilizing a bottle label coated with a heat-activatable, barrier copolyester adhesive resin to impart extra barrier properties to the PET bottle. This process requires that the inside of the label be completely coated with the adhesive and that the entire inner surface of the label be securely bonded to the bottle. Such process is different from the current industry practice where a bottle label is spot or strip tacked with a hot melt adhesive to the bottle and the label overlap is glue sealed.

The most widely used labels for PET carbonated-beverage bottles are two-layer laminations of polypropylene films. The outside layer is a transparent polypropylene layer of about 0.5 mils (13 $\mu$m) thickness, which is reverse printed inside, and the inside layer is an opaque polypropylene layer of about 1 mil (25 $\mu$m) thickness, which provides the function of accentuating the printed message on the outside layer.

Although such method as the barrier adhesive layer disclosed above provides sufficient barrier properties for larger bottles, it is desirable to have a barrier label system of higher barrier properties that provides high enough barrier properties to be useful for small beverage bottles. It is further desirable to have a barrier label system that does not require changes in the current manufacturing practice of applying the labels to the PET bottles. It is also desirable to have a label system that can be removed in order to facilitate the post-consumer recycling of the bottle.

SUMMARY OF THE INVENTION

In one aspect of the present invention, there is provided a multilayer barrier label for polyethylene terephthalate bottles comprising an outer protective layer of a thermoplastic polymer, providing moisture barrier properties, and wear and chemical resistances; a barrier layer adjacent to the outer protective layer comprising a barrier polymer selected from the group consisting of polyvinyl alcohol, ethylene vinyl alcohol copolymers and blends thereof; an inner protective layer of a thermoplastic polymer adjacent to the barrier layer, providing moisture barrier properties and chemical resistances; and an optional, opaque layer of a thermoplastic polymer adjacent to the inner protective layer, wherein the label reduces the carbon dioxide permeability of the section of the beverage bottles enveloped by the label to below about 1 cc/100 in$^2$/24 hr.

In a further aspect of the present invention, there is provided a beverage bottle comprising a thermoplastic bottle and an above-disclosed barrier label.

The present invention further provides a high barrier label for beverage bottles that does not require any modification to the current manufacturing procedures of the bottles.

The present invention also provides a high barrier label system that does not interfere with the recycling process of the bottles.

DETAILED DESCRIPTION OF THE INVENTION

The barrier label of this invention is a multilayer barrier laminate comprising a barrier structure preferably having a thickness of about 0.3 mils (8 μm) to about 2.0 mils (51 μm), more preferably about 0.4 mils (10 μm) to about 1 5 mils (38 μm), most preferably about 0.5 mils (13 μm) to about 1 mil (25 μm), and an optional opaque innermost layer. The barrier label structure comprises an outer protective layer, a barrier layer adjacent to the outer protective layer, and an inner protective layer adjacent to the barrier layer. The barrier label of the instant invention may also consist only of an outer protective layer and a barrier layer, wherein the label information is reverse printed on the barrier layer. This structure, however, is not preferred since the inks and other chemical employed in printing the label may interfere with the barrier properties of the barrier layer. In accordance with the present invention, the thickness of each layer of the barrier label can vary to accommodate the need of different applications. However, the preferred barrier structure of the present invention comprises the thickness of from about 25% to about 50% of the barrier layer based on the total thickness of the structure.

The barrier label of the present invention preferably reduces the carbon dioxide permeability of the thin shelled cylindrical section of a PET carbonated-beverage bottle to below about 1 cc/100 in$^2$/24 hr ($1.55 \times 10^{-3}$ cc/cm$^2$/24 hr), more preferably to below about 0.8 cc/100 in$^2$/24 hr ($1.24 \times 10^{-3}$ cc/cm$^2$/24 hr), most preferably to below about 0.6 cc/100 in$^2$/24 hr ($0.93 \times 10^{-3}$ cc/cm$^2$/24 hr). This is in contrast to a carbon dioxide permeability of about 6 cc/100 in$^2$/24 hr ($9.3 \times 10^{-3}$ cc/cm$^2$/24 hr) in a typical PET carbonated-beverage bottle without such a label. The barrier label of the present invention is particularly useful for PET carbonated-beverage bottles having a surface area to volume ratio of more than 600 cm$^{-1}$. In addition, as a preferred embodiment of the present invention, it is particularly desirable to have the barrier label cover at least a major part of the thin shelled cylindrical section of a PET carbonated-beverage bottle in congruence with or in excess of the current labeling practice in the beverage industry.

The outer protective layer of the barrier structure is selected to provide sufficient resistances to the abrasion, and chemical and moisture exposures during the normal handling processes of the beverage bottle. In addition, the outer protective layer should be relatively transparent in order to prevent the information printed on the inner protective layer from being obscured. The outer protective layer should also have adequate physical strength. The outer protective layer in combination with other layers of the label should have sufficient physical integrity to augment the strength of the beverage bottle to withstand the outwardly pressure of the pressurized content inside the PET bottle and the pressure build up from the carbon dioxide permeating from the inside content. It is further desirable to have the outer protective layer exhibit good gas barrier properties to supplement the gas-barrier function of the barrier layer. Consequently, the outer protective layer is selected from the thermoplastic polymers that exhibit good wear properties, chemical resistances to common consumer products, such as household cleaners, transparency, and moisture- and gas-barrier properties The inner protective layer of the barrier structure of this invention provides a surface amenable to the label printing process, chemical resistance and moisture-barrier property to protect the barrier layer, and contributes to the overall physical strength of the label. In general, the label information is reverse printed on the outer surface of this layer, not on the outer protective layer, in order to protect the printed information from being scuffed off during the normal handling processes of the bottle. This protective layer also acts to separate printing chemicals from contacting and adversely reacting with the barrier layer. In addition, it is further desirable for the inner protective layer to have good ga barrier properties.

The films and film forming polymer resins having suitable properties for both of the inner and outer protective layers of this invention include:

polyolefins, such as polyethylene, polypropylene, polybutylene and copolymers and blends thereof;

polyesters, such as homopolymers and copolymers of polybutylene terephthalate and polyethylene terephthalate, including cyclohexanedimethanol-modified polyethylene terephthalate (PETG);

nylons, such as nylon 6, nylon 6,6, nylon 6,10, nylon 11, nylon 12, and copolymers and blends thereof;

polystyrene;

polycarbonate; and polyvinyl chloride.

Of these, preferred are polypropylene, polyethylene terephthalate, nylon 6, nylon 6,6, and copolymers and blends thereof for their barrier properties and chemical resistances, and good physical strength.

The barrier layer of the barrier structure of this invention is selected from the barrier resins known in the art to provide good carbon dioxide and oxygen barrier properties. Preferably, the barrier layer of this invention is enclosed by the outer and inner protective layers to protect it from the abrasion, chemical and moisture exposures during the normal handling processes of the bottle. The barrier resins suitable for use in conjunction with this invention include polyvinyl alcohol, ethylene vinyl alcohol copolymers and blends thereof. Preferred are ethylene vinyl alcohol copolymers for their extrusion processibility.

Polyvinyl alcohol is commercially produced by direct hydrolysis or catalyzed alcoholysis of polyvinyl acetate, and polyvinyl acetate is a polymerization product of vinyl acetate in the presence of a free-radical initiator. As is known in the art, numerous vinyl alcohol copolymers have been prepared. Of these, vinyl alcohol copolymers with about 20 to about 40% of ethylene are known for their gas barrier properties and processibility. Polyvinyl alcohol and ethylene vinyl alcohol copolymers suitable for this invention are commercially available from various manufacturers including Kuraray of Japan, Eval Company of America, Nippon Gohsei of Japan, and E.I. DuPont Company. Kuraray produces an ethylene vinyl alcohol copolymers under the designation "EP-E" which has about 32 to 36% ethylene and correspondingly about 64 to 68% vinyl alcohol, a number average molecular weight, measured by osmometry, of about 29,500 and melting point of 324° F. (162° C.). One suitable copolymer has about 29% ethylene, a number average molecular weight of about 22,000 and a melting point of 356° F. (180° C.). Another copolymer described in U.S. Pat. No. 4,254,169 to Schroeder has 40% ethylene, a average molecular weight of about 26,000 and a melting point of 327° F. (164° C.).

The barrier layer may require an adhesive to be firmly bound to the inner and outer protective layers, especially when the barrier layer polymer does not readily interact with the protective layer polymers to form a good interfacial adhesion. For example, laminating an ethylene vinyl alcohol copolymer barrier layer to a polypropylene or polyester layer may require the use of an adhesive, while laminating the barrier layer to a nylon layer does not. Ethylene vinyl alcohol copolymers adhere strongly to most nylons without the use of an adhesive. The adhesives suitable for binding the barrier layers to the protective layers of this invention are well known in the art, and they include modified polyolefins, such as ethylene copolymers of vinyl acetate, acrylic acids, acrylic acid esters, dicarboxylic acids and dicarboxylic acid anhydrides. Non-limiting examples of such suitable modified polyolefin adhesives include ethylene vinyl acetate, ethylene acrylate, ethylene methacrylate, ethylene methyl methacrylate, ethylene acrylic acid, ethylene methacrylic acid, maleic anhydride modified ethylene and the like. Such adhesives are disclosed, for example, in U.S. Pat. No. 4,254,169 to Schroeder, U.S. Pat. No. 4,869,963 to Gallucci et al., and U.S. Pat. No. 4,898,784 to Sanders et al., in conjunction with laminates comprising ethylene vinyl alcohol copolymers and thermoplastic polymers.

The barrier structure of this invention may be produced by conventional methods useful in producing multilayer films such as by coextrusion techniques and lamination techniques. Coextrusion techniques include methods which include the use of a feed block with a standard die, a multimanifold die such as a circular die for blown bubble film, as well as a multimanifold die such as used in forming multilayer films for forming flat cast films. In order to produce a multilayer film by a coextrusion process, it is necessary that the constituents used to form each of the individual layers have similar melt properties during the film extrusion process. Such melt properties of interest include melting points, melting indices, apparent viscosity, as well as melt stability. The similar melt properties assure the production of a multilayer film having good adhesion and relatively uniform thickness across the width of the film being produced. Further, it is important that the constituents used to form a multilayer film have similar melt properties within a relatively close temperature range so that they may be extruded through a common die.

Alternatively, the barrier structure of the present invention can be produced by lamination techniques well known in the art. Such lamination techniques involve forming a multilayer film structure from pre-fabricated film plies. The basic methods used in film laminating techniques are fusion, wet combining, and heat reactivation. Fusion is a method of laminating two or more film plies using heat and pressure without the use of adhesives. This method can only be used where the films being laminated are comprised of polymers that readily form interfacial adhesion. Wet combining and heat reactivation are utilized in laminating incompatible films using adhesive materials Further details of lamination techniques are disclosed, for example, in the Modern Plastics Encyclopedia, Vol. 57, No. 10A, pp 345-348, McGraw Hill, October 1980.

The inner and outer protective layers of the instant barrier structure may be of a same polymer or of two different polymers to suit the needs of particular applications. For example, the barrier structure may comprise two protective layers of nylon and a barrier layer, such as an ethylene vinyl alcohol copolymer, in order to avoid the need for an adhesive and to simplify the manufacturing process. The barrier structure may comprise a polypropylene outer protective layer, a nylon inner protective layer and a barrier layer in order to combine the excellent moisture barrier properties of polypropylene and the outstanding gas barrier properties of nylon. And the barrier structure may comprise two protective layers of polyethylene terephthalate and a barrier layer in order to facilitate the recyclability of the resulting bottle.

The optional innermost opaque layer provides translucent background to the label such that the information printed on the inner protective layer is clearly visible. This layer can also impart gas barrier properties, chemical resistances, and physical strength to the label structure. Preferred films and film forming polymer resins suitable for the opaque layer include: polyolefins, such as polyethylenes, polypropylene and polybutylene; polyesters, such as polyethylene terephthalate; nylons, such as nylon 6, nylon 6,6, nylon 6,10, nylon 11 and nylon 12; polystyrene; polycarbonate; and polyvinyl chloride Of these, more preferred are polypropylene, polyethylene terephthalate, nylon 6 and nylon 6,6 for their superior barrier properties and chemical resistances, and good physical strength The opaqueness of the layer can be imparted by processes known in the art, such as adding colorant or pigment (e.g., titanium dioxide) and the like.

The opaque layer can be laminated to the barrier structure with an adhesive known in the art or coextruded with the barrier structure along with an adhesive layer between the opaque layer and the barrier structure. The adhesives suitable for such laminate structures include the above-mentioned adhesives that are useful for bonding the barrier layer and the protective layers, such as ethylene copolymers modified with vinyl acetate, acrylic acids, acrylic acid esters, dicarboxylic acids and dicarboxylic acid anhydrides.

As is known in the art, orienting a polymeric laminate or film improves gas barrier and physical strength properties. Consequently, the preferred barrier structure of the barrier label of the present invention is oriented in at least one direction in order to further improve the gas barrier properties and physical strength. Optionally, the opaque layer can also be oriented. Such orientation can be imparted to the barrier label before or after laminating the opaque layer to the barrier structure. Furthermore, if the barrier structure is manufactured by a lamination technique, each layer can be oriented prior to the lamination procedure. In general, orientation is imparted to a laminate or a film by stretching or drawing in at least one direction under heat. The process of imparting orientation by drawing in one direction is commonly referred as monoaxial orientation; in two perpendicular directions, biaxial orientation. The degree of orientation is characterized in the art by the draw ratio, and the term draw ratio is an indication of the increase in the dimension in the direction of draw. The preferred barrier structure of the barrier label of the present invention is drawn to a draw ratio of from 1.5:1 to 4:1 in at least one direction. The orientation procedures suitable for this invention is disclosed in European Patent 0,132,565 to DeAntonis et al, which is hereby incorporated by reference.

In accordance with the present invention, it is possible to obtain the improved gas barrier properties without making modifications to the current label affixation process of spot or strip tacking since the pressurized beverage content expands the bottle sufficiently enough to form a tight seal between the bottle and the barrier label. Therefore, the barrier label of the present invention imparts high barrier properties to the beverage bottle without adversely affecting the bottle recyclability.

Although the present invention is directed toward the barrier label for PET carbonated-beverage bottles. The barrier label of the present invention can be utilized for other thermoplastic bottle and container applications where the barrier properties to prevent in-flow and out-flow of permeable materials such as carbon dioxide, oxygen, various aromas and volatile flavors are required. Furthermore, the barrier label affixation procedure to bottles and containers can be modified to suit the need of different applications. For example, the barrier label can be affixed to a non-carbonated bottle after applying an adhesive to the entire inner periphery of the label, providing gas and other volatile barrier properties to the bottle without significantly sacrificing the post-consumer removability of the label.

As can be seen from the above, the barrier label of the present invention provides high gas barrier properties that can be useful even for small beverage bottles having a surface area to volume ratio of more than 600 cm$^{-1}$. In addition, the barrier label does not require any modification to the current beverage bottle manufacturing and label applying procedures, and does not interfere with the post-consumer recycling process of the bottle.

What is claimed is:

1. A multilayer barrier label for polyethylene terephthalate bottles, which is affixed to said bottles by a spot or strip tacking process, comprising:
   a) an outer protective layer of a thermoplastic polymer, providing moisture barrier properties, and wear and chemical resistances;
   b) a barrier layer adjacent to said outer protective layer comprising a barrier polymer selected from the group consisting of polyvinyl alcohol, ethylene vinyl alcohol copolymers and blends thereof;
   c) an inner protective layer of a thermoplastic polymer adjacent to said barrier layer, providing moisture barrier properties and chemical resistances; and
   d) an optional, opaque layer of a thermoplastic polymer adjacent to said inner protective layer,
wherein said label reduces the carbon dioxide permeability of the section of said bottles covered by said label to below about 1 cc/100 in$^2$/24 hr.

2. The barrier label according to claim 1 wherein said outer protective layer is selected from the group consisting of polyamides, polyolefins and polyesters.

3. The barrier label according to claim 1 wherein said outer protective layer is selected from the group consisting of nylon 6, nylon 6,6, and copolymers and blends thereof.

4. The barrier label according to claim 1 wherein said outer protective layer is a polyethylene terephthalate layer.

5. The barrier label according to claim 1 wherein said outer protective layer is a polypropylene layer.

6. The barrier label according to claim 1 wherein said outer protective layer is selected from the group consisting of polyamides, polyolefins and polyesters.

7. The barrier label according to claim 1 wherein said inner protective layer is selected from the group consisting of nylon 6, nylon 6,6, and copolymers and blends thereof.

8. The barrier label according to claim 1 wherein said inner protective layer is a polyethylene terephthalate layer 9. The barrier label according to claim 1 further comprises adhesive layers between said outer protective layer and said barrier layer, said barrier layer and said inner protective layer, and said inner protective layer and said opaque layer, wherein said adhesive layers are selected from the group consisting of polyvinyl acetate, ethylene vinyl acetate, ethylene acrylate, ethylene methyl acrylate, ethylene methacrylate, ethylene methyl methacrylate, ethylene acrylic acid, ethylene methacrylic acid, and maleic anhydride modified ethylene.

10. The barrier label according to claim 1 wherein said barrier label is oriented in at least one direction.

11. A barrier label for polyethylene terephthalate beverage bottles, which is affixed to said bottles by a spot or strip tacking process, comprising:
   a) an outer protective layer of a thermoplastic polymer, providing moisture barrier properties, and wear and chemical resistances;
   b) a barrier layer adjacent to said outer protective layer comprising a barrier polymer selected from the group consisting of polyvinyl alcohol, ethylene vinyl alcohol copolymers; and
   c) an optional, opaque layer of a thermoplastic polymer adjacent to said barrier layer,
wherein said label reduces the carbon dioxide permeability of the section of the beverage bottles enveloped by said label to below about 1 cc/100 in$^2$/24 hr.

12. A barrier label for polyethylene terephthalate beverage bottles, which is affixed to said bottles by a spot or strip tacking process, comprising:
   a) an outer protective layer of a nylon, providing moisture barrier properties, and wear and chemical resistances;
   b) a barrier layer of an ethylene vinyl alcohol copolymer adjacent to said outer layer;
   c) an inner protective layer of a nylon adjacent to said barrier layer, providing moisture barrier properties and chemical resistances; and
   d) an optional, opaque polypropylene layer adjacent to said inner protective layer,
wherein said label reduces the carbon dioxide permeability of the section of the beverage bottles enveloped by said label to below about 1 cc/100 in$^2$/24 hr.

13. The barrier label according to claim 12 wherein said barrier label is oriented by drawing to a draw ratio of from 1.5:1 to 4:1 in at least one direction.

14. The barrier label according to claim 13 wherein said barrier label is monaxially oriented.

15. The barrier label according to claim 12 wherein said barrier label comprises:
a barrier structure comprising an outer protective layer of a nylon, a barrier layer of an ethylene vinyl alcohol copolymer adjacent to said outer protective layer, and an inner protective layer of a nylon adjacent to said barrier layer, and
an opaque polypropylene layer adjacent to said inner protective layer.

16. A multilayer barrier label for polyethylene terephthalate bottles, which is affixed to said bottles by a spot or strip tacking process, comprising:
a) an outer protective layer of a thermoplastic polymer, providing moisture barrier properties, and wear and chemical resistances;
b) a barrier layer adjacent to said outer protective layer;
c) an inner protective layer of a thermoplastic polymer adjacent to said barrier layer, providing moisture barrier properties and chemical resistances; and
d) an optional, opaque layer of a thermoplastic polymer adjacent to said inner protective layer,
wherein said label reduces the carbon dioxide permeability of the section of said bottles enveloped by said label to below about 1 cc/100 in$^2$/24 hr.

17. A bottle comprising a thermoplastic bottle and a barrier label, wherein said barrier label, which is affixed to said bottle by a spot or strip tacking process, comprises:
a) an outer protective layer of a thermoplastic polymer, providing moisture barrier properties, and wear and chemical resistances;
b) a barrier layer adjacent to said outer protective layer comprising a barrier polymer selected from the group consisting of polyvinyl alcohol, ethylene vinyl alcohol copolymers and blends thereof;
c) an inner protective layer of a thermoplastic polymer adjacent to said barrier layer, providing moisture barrier properties and chemical resistances; and
d) an optional, opaque layer of a thermoplastic polymer adjacent to said inner protective layer,
wherein said label reduces the carbon dioxide permeability of the section of the beverage bottles enveloped by said label to below about 1 cc/100 in$^2$/24 hr.

18. The bottle according to claim 17 wherein said thermoplastic bottle is a polyethylene terephthalate bottle.

19. The bottle according to claim 17 wherein said inner protective layer is selected from the group consisting of polyamides, polyolefins and polyesters.

20. The bottle according to claim 17 wherein said outer protective layer is selected from the group consisting of polyamides, polyolefins and polyesters.

21. The bottle according to claim 17 wherein said barrier label is oriented by drawing to a draw ratio of from 1.5:1 to 4:1 in at least one direction.

22. The bottle according to claim 17 wherein said bottle has a surface area to volume ratio of more than 600 cm$^{-1}$.

* * * * *